United States Patent
Shimizu

(10) Patent No.: US 10,437,224 B2
(45) Date of Patent: Oct. 8, 2019

(54) NUMERICAL CONTROLLER CAPABLE OF COMPENSATING ERROR IN CONSIDERATION OF AXIS MOVEMENT DIRECTION

(71) Applicant: FANUC CORPORATION, Minamitsuru-gun, Yamanashi (JP)

(72) Inventor: Tsuyuki Shimizu, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 357 days.

(21) Appl. No.: 15/202,792

(22) Filed: Jul. 6, 2016

(65) Prior Publication Data
US 2017/0010600 A1 Jan. 12, 2017

(30) Foreign Application Priority Data
Jul. 10, 2015 (JP) ................................. 2015-138397

(51) Int. Cl.
*G05B 19/404* (2006.01)

(52) U.S. Cl.
CPC .. *G05B 19/404* (2013.01); *G05B 2219/49198* (2013.01); *G05B 2219/50297* (2013.01)

(58) Field of Classification Search
CPC ........ G05B 19/404; G05B 2219/50297; G05B 2219/49344; G05B 2219/49198
See application file for complete search history.

(56) References Cited

U.S. PATENT DOCUMENTS

| 2005/0042052 | A1* | 2/2005 | Nakazato | G05B 19/4086 409/80 |
| 2009/0140684 | A1 | 6/2009 | Otsuki et al. | |
| 2009/0228138 | A1* | 9/2009 | Otsuki | G05B 19/404 700/187 |
| 2011/0234142 | A1* | 9/2011 | Otsuki | G05B 19/404 318/572 |
| 2012/0001583 | A1 | 1/2012 | Otsuki et al. | |

(Continued)

FOREIGN PATENT DOCUMENTS

| CN | 102207730 A | 10/2011 |
| CN | 102331743 A | 1/2012 |

(Continued)

OTHER PUBLICATIONS

Notification of Reasons for Refusal for Japanese Application No. 2015-138397, dated Nov. 7, 2017 with translation, 8 pages.

(Continued)

*Primary Examiner* — Robert E Fennema
*Assistant Examiner* — Santosh R Poudel
(74) *Attorney, Agent, or Firm* — RatnerPrestia

(57) ABSTRACT

A numerical controller controlling a five-axis machining machine having three linear axes and two rotation axes acquires a linear-axis-caused compensation amount associated with a combination of an instructed linear axis position and linear axis movement direction and an rotation-axis-caused compensation amount associated with a combination of an instructed rotation axis position and rotation axis movement direction, calculate a translation/rotation compensation amount based on the linear-axis-caused compensation amount and the rotation-axis-caused compensation amount, and adds the calculated translation/rotation compensation amount to the instructed linear axis position.

3 Claims, 15 Drawing Sheets

(56) References Cited

U.S. PATENT DOCUMENTS

| | | | |
|---|---|---|---|
| 2012/0191238 A1* | 7/2012 | Sakai | G05B 19/404 |
| | | | 700/189 |
| 2013/0060373 A1 | 3/2013 | Otsuki | |
| 2015/0094847 A1 | 4/2015 | Liu | |

FOREIGN PATENT DOCUMENTS

| | | |
|---|---|---|
| CN | 102999007 A | 3/2013 |
| JP | H 0772913 A | 3/1995 |
| JP | 08118204 A | 5/1996 |
| JP | 2009-151756 A | 7/2009 |
| JP | 4327894 B2 | 9/2009 |
| JP | 2010026997 A | 2/2010 |
| JP | 2012014335 A | 1/2012 |
| JP | 2015069355 A | 4/2015 |

OTHER PUBLICATIONS

Chinese Office Action for Chinese Application No. 2016105384666, dated Jul. 2, 2018 with translation, 12 pages.

* cited by examiner

FIG.2A

ROTATION AXIS COMBINATION

|   |   | ROTATION AXIS | |
|---|---|---|---|
|   |   | FIRST | SECOND |
| 1 | MOVEMENT DIRECTION | POSITIVE | POSITIVE |
| 2 | | POSITIVE | NEGATIVE |
| 3 | | NEGATIVE | POSITIVE |
| 4 | | NEGATIVE | NEGATIVE |

FIG.2B

LINEAR AXIS COMBINATION

|   |   | LINEAR AXIS | | |
|---|---|---|---|---|
|   |   | X | Y | Z |
| 1 | MOVEMENT DIRECTION | POSITIVE | POSITIVE | POSITIVE |
| 2 | | POSITIVE | POSITIVE | NEGATIVE |
| 3 | | POSITIVE | NEGATIVE | POSITIVE |
| 4 | | POSITIVE | NEGATIVE | NEGATIVE |
| 5 | | NEGATIVE | POSITIVE | POSITIVE |
| 6 | | NEGATIVE | POSITIVE | NEGATIVE |
| 7 | | NEGATIVE | NEGATIVE | POSITIVE |
| 8 | | NEGATIVE | NEGATIVE | NEGATIVE |

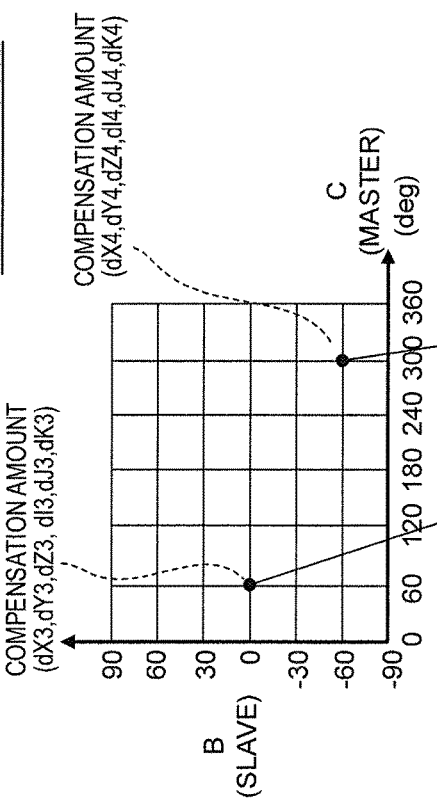
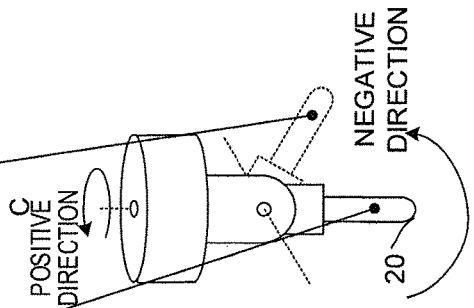
FIG.6A
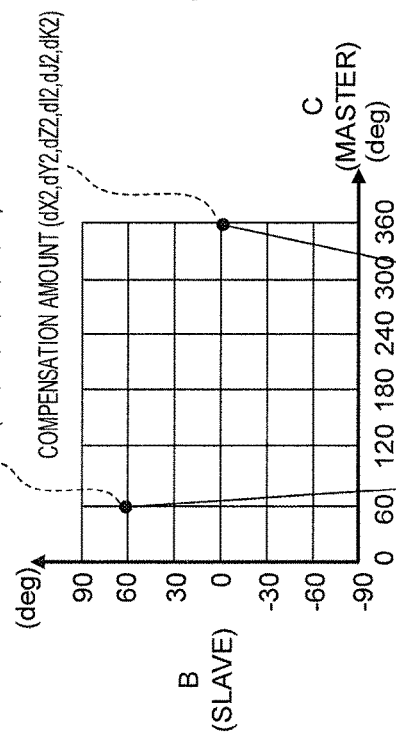
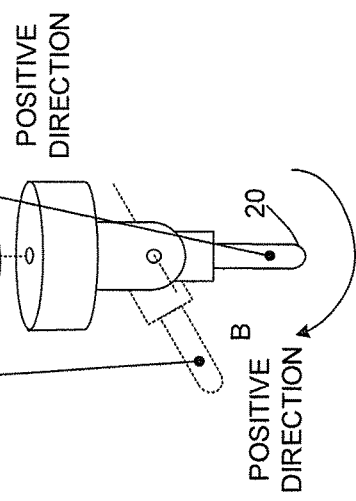
FIG.6B

FIG.7A
LATTICED AREA 3
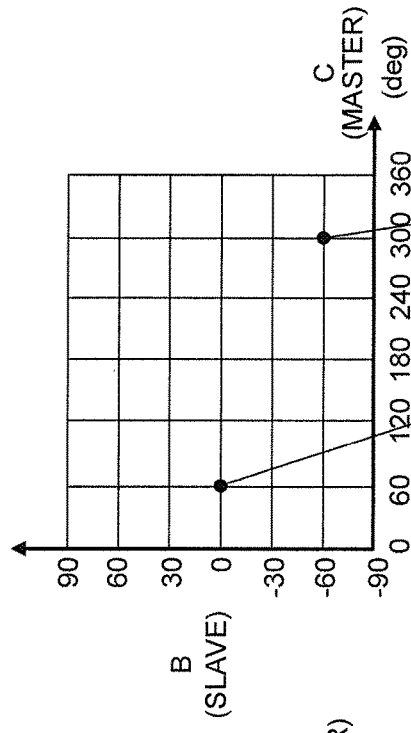
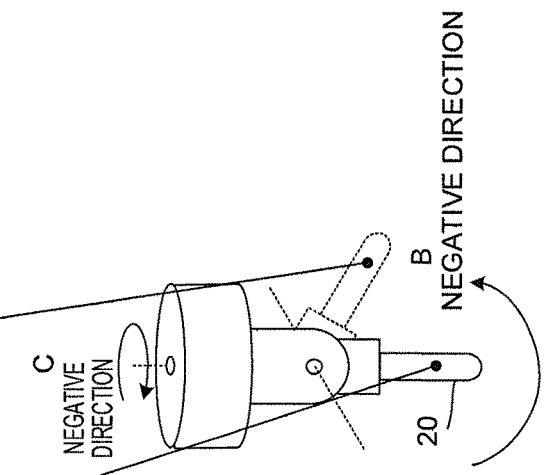
FIG.7B
LATTICED AREA 4
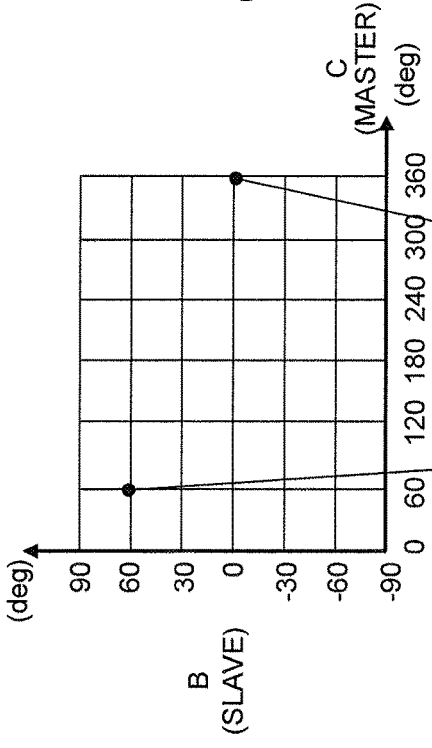
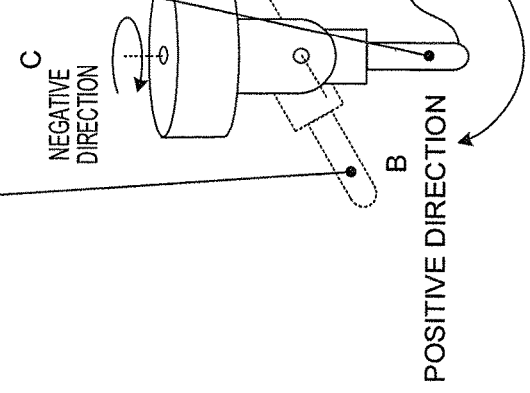

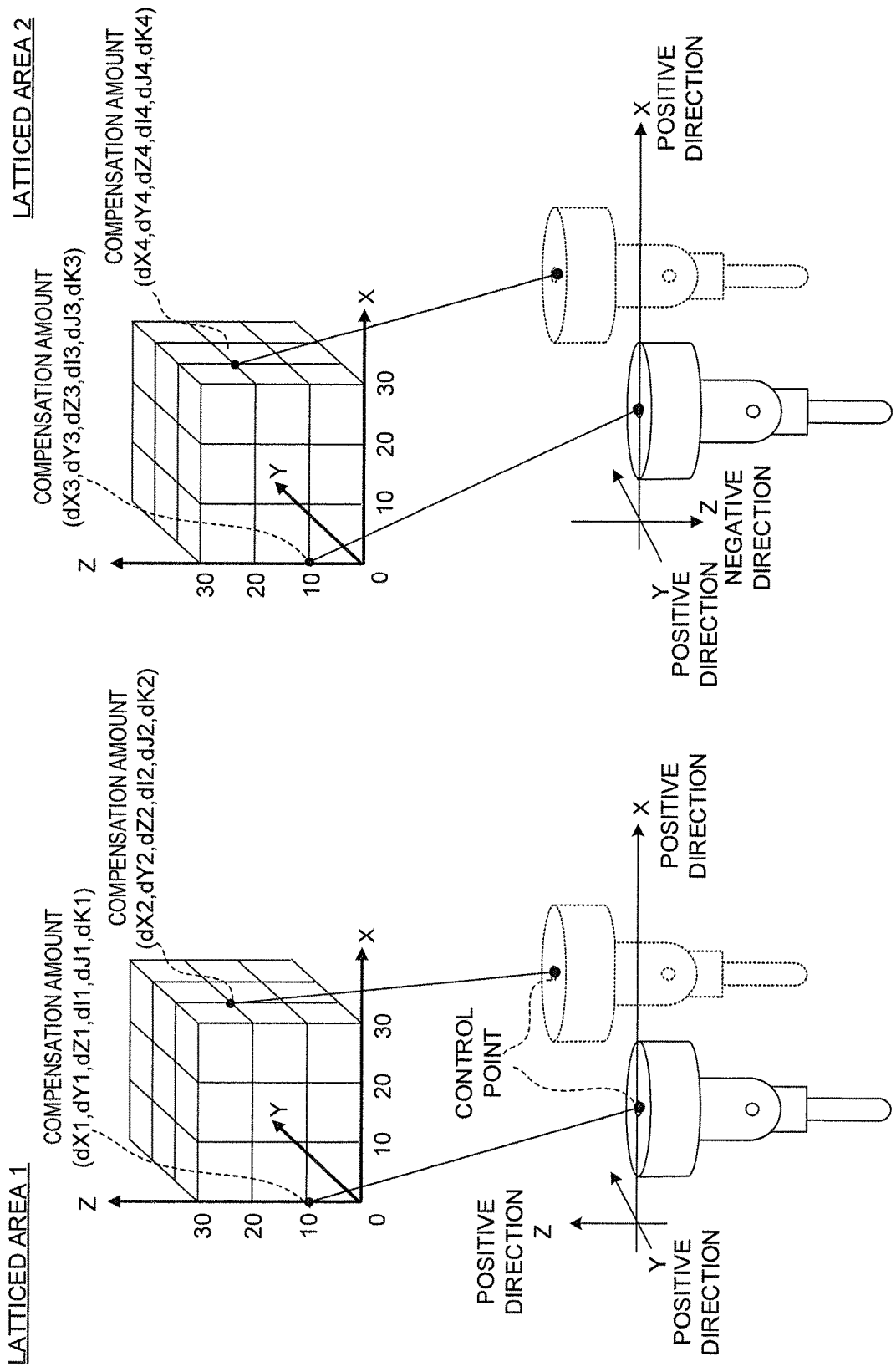

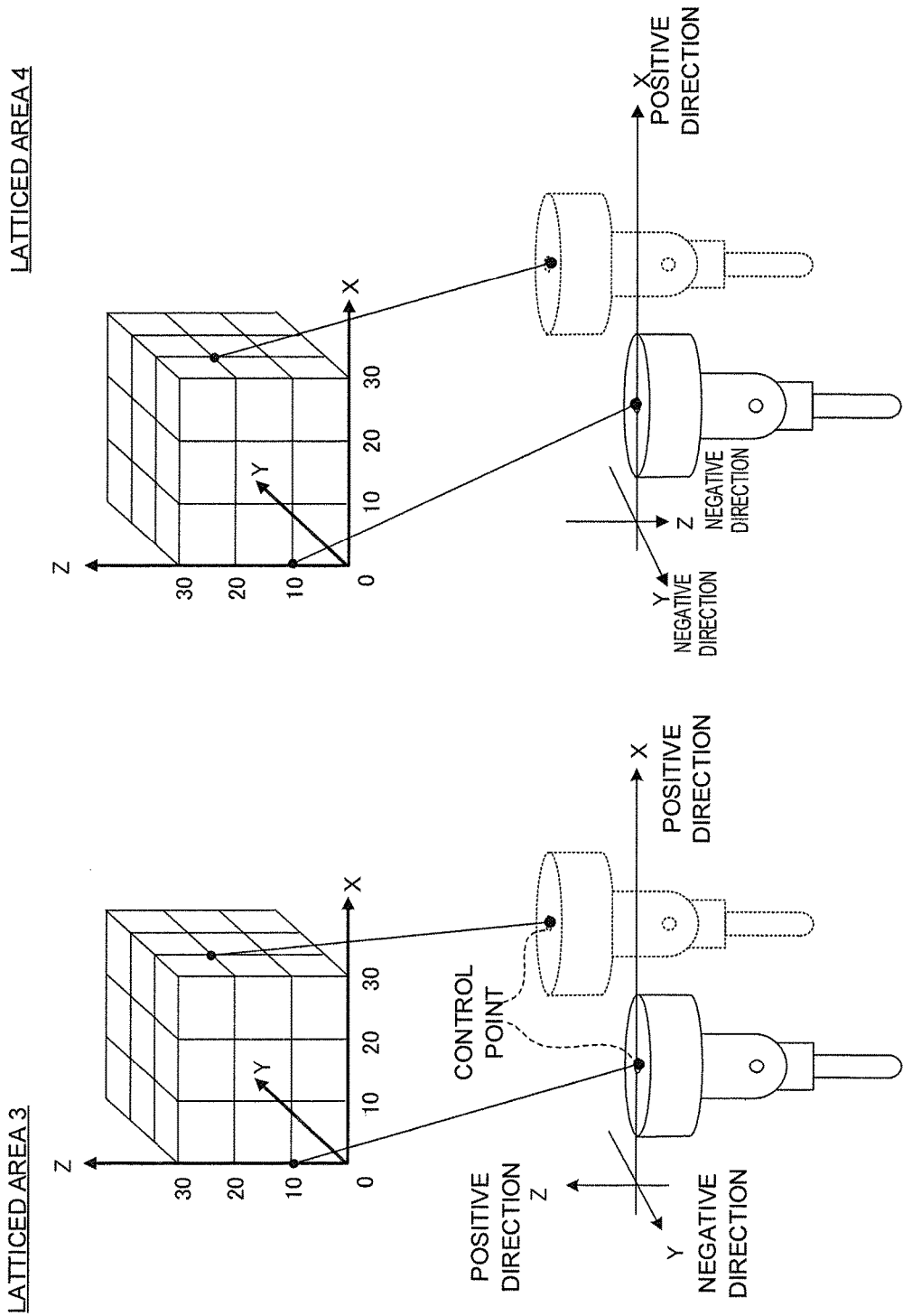

LATTICED AREA 5

LATTICED AREA 6

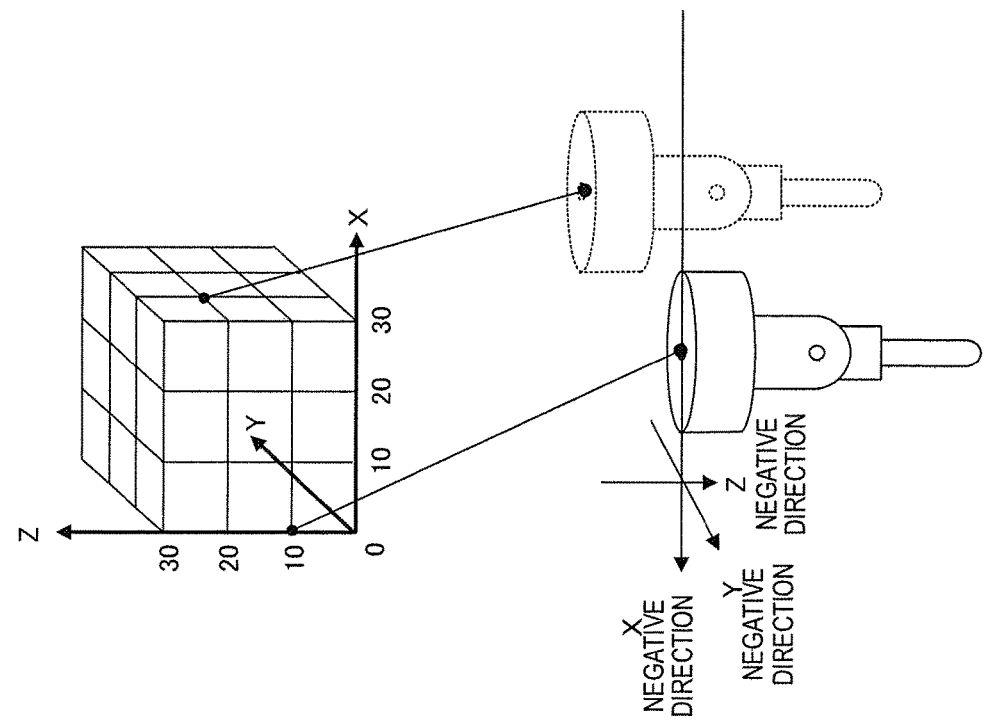
FIG.11B  LATTICED AREA 8
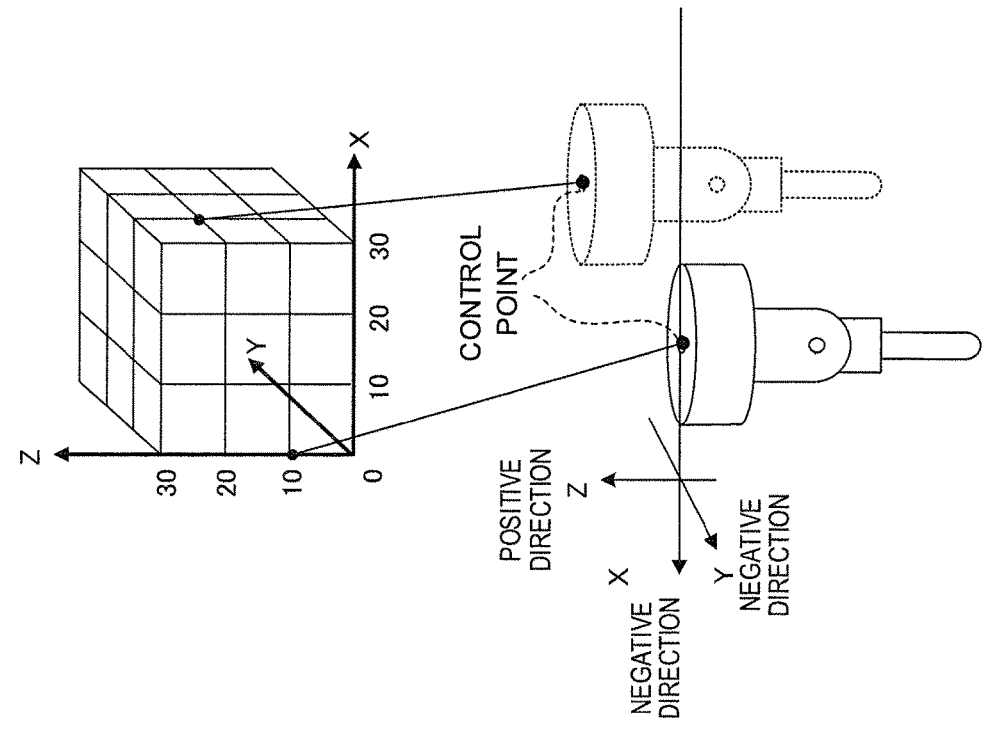
FIG.11A  LATTICED AREA 7

FIG.15B
LATTICED AREA 4
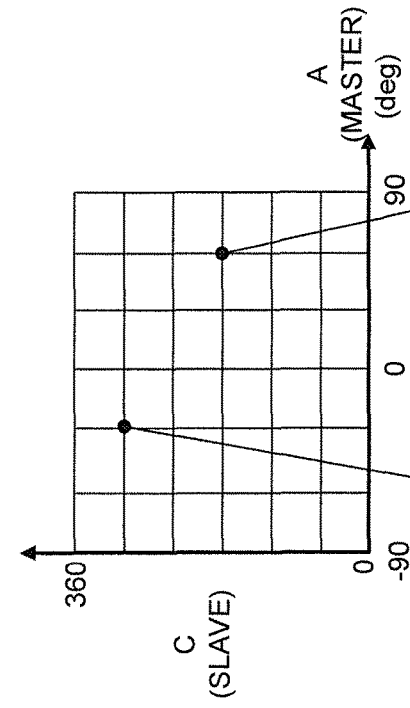
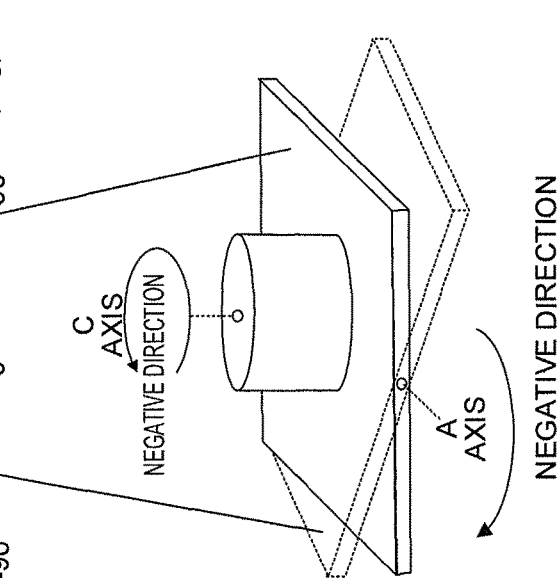
FIG.15A
LATTICED AREA 3  COMPENSATION AMOUNT (dX1,dY1,dZ1, dI1,dJ1,dK1)
COMPENSATION AMOUNT (dX2,dY2,dZ2,dI2,dJ2,dK2)
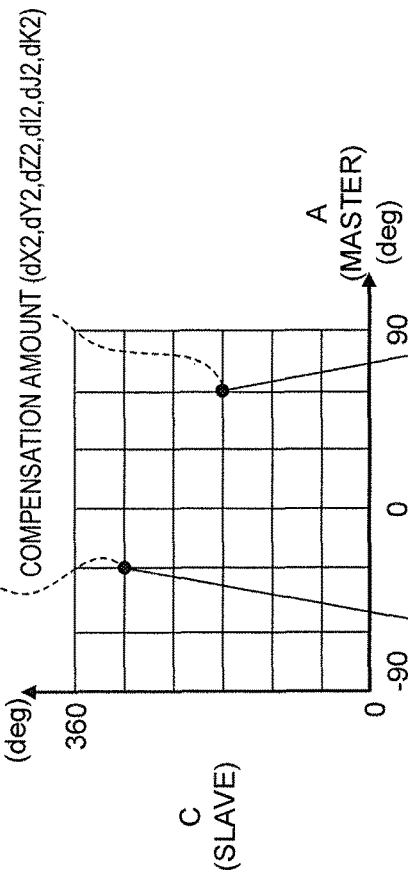
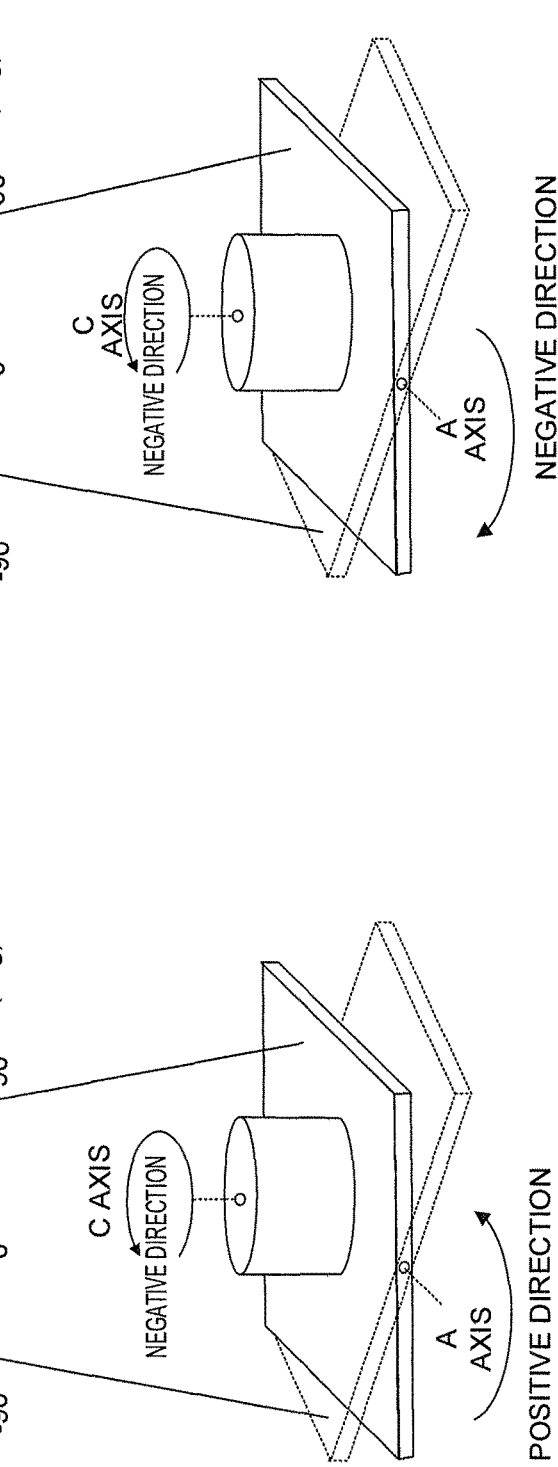

NUMERICAL CONTROLLER CAPABLE OF COMPENSATING ERROR IN CONSIDERATION OF AXIS MOVEMENT DIRECTION

BACKGROUND OF THE INVENTION

1. Field of the Invention

The present invention relates to a numerical controller and particularly to a numerical controller having an error compensation function in consideration of an axis movement direction.

2. Description of the Related Art

An error occurs between a target position and an actual movement position of a feed shaft of a machine tool controlled by a numerical controller. Since the amount of the error becomes different by each movement position, a method of compensating the error in response to the movement position has been proposed in the past.

For example, JP 2009-151756 A discloses a technique of dividing a linear axis coordinate system and a rotation axis coordinate system into latticed areas, storing lattice point compensation vectors in lattice points, calculating an axis dependent translation compensation amount and an axis dependent rotation compensation amount from a linear axis position and a rotation axis position based on the lattice point compensation vector, and compensating the linear axis position.

The above-described technique can compensate an error of a tool center point caused by an error at a previously measured machine position. However, since a space error map is created for a compensation based on only position information, an error difference occurring in a movement direction (a positive direction and a negative direction) of a machine caused by degradation of a driving portion cannot be accurately compensated.

Further, JP 07-072913 A discloses a technique of storing pitch error compensation amounts in both positive and negative movement directions every preset compensation section and reading a compensation amount in response to a movement direction and a compensation section including a current position and outputting the read compensation amount.

The above-described technique can compensate an error in consideration of the positive/negative movement direction. However, only each axis can be compensated separately.

SUMMARY OF THE INVENTION

Here, an object of the invention is to provide a numerical controller capable of compensating an error in consideration of an axis movement direction in addition to positions of a linear axis and a rotation axis.

A numerical controller according to the invention controls a five-axis machining machine having three linear axes and two rotation axes and machining a workpiece set on a table based on an instruction of a program. The numerical controller comprises: a direction compensation amount storage unit configured to store a linear-axis-caused compensation amount associated with a combination of a linear axis position and a linear axis movement direction and a rotation-axis-caused compensation amount associated with a combination of a rotation axis position and a rotation axis movement direction; an axis movement direction determination unit configured to determine an instruction linear axis movement direction as each of the linear axis movement directions based on the instruction and an instruction rotation axis movement direction as each of the rotation axis movement directions based on the instruction; a movement-direction compensation-amount acquisition unit configured to acquire a linear-axis-caused compensation amount associated with the linear axis position based on the instruction and the instruction linear axis movement direction and a rotation-axis-caused compensation amount associated with the rotation axis position and the instruction rotation axis movement direction, by referring to the direction compensation amount storage unit; and a compensation unit configured to calculate a translation/rotation compensation amount based on the linear-axis-caused compensation amount and the rotation-axis-caused compensation amount and to add the calculated translation/rotation compensation amount to the linear axis position based on the instruction.

The direction compensation amount storage unit may divide a three-dimensional coordinate system space formed of the three linear axes, for each combination of the linear axis movement directions, into latticed areas having a predetermined interval in each axis direction, and stores a lattice point compensation vector formed of a translation compensation amount and a rotation compensation amount at each lattice point of the divided latticed areas.

The direction compensation amount storage unit may divide a two-dimensional coordinate system space formed of the two rotation axes, for each combination of the rotation axis movement directions, into latticed areas having a predetermined interval in each axis direction and stores a lattice point compensation vector formed of a translation compensation amount and a rotation compensation amount at each lattice point of the divided latticed areas.

According to the invention, since an error changed by the movement direction is also considered in addition to an error caused by the linear axis/rotation axis position of the machine, the quality of the shape of a workpiece to be machined can be improved.

BRIEF DESCRIPTION OF THE DRAWINGS

The forgoing and other objects and feature of the invention will be apparent from the following description of preferred embodiments of the invention with reference to the accompanying drawings, in which:

FIGS. 2A and 2B are diagrams illustrating an example of a combination of the axis movement directions generating the latticed areas;

FIG. 6A illustrates a latticed area generated by a combination of a positive movement direction of a master rotation axis (C) of the five-axis machining machine illustrated in FIG. 5 and a positive movement direction of a slave rotation axis (B) thereof;

FIG. 6B illustrates a latticed area generated by a combination of a positive movement direction of the master rotation axis (C) of the five-axis machining machine illustrated in FIG. 5 and a negative movement direction of the slave rotation axis (B) thereof;

FIG. 7A illustrates a latticed area generated by a combination of a negative movement direction of the master rotation axis (C) of the five-axis machining machine illustrated in FIG. 5 and a positive movement direction of the slave rotation axis (B) thereof;

FIG. 7B illustrates a latticed area generated by a combination of a negative movement direction of the master rotation axis (C) of the five-axis machining machine illustrated in FIG. 5 and a negative movement direction of the slave rotation axis (B) thereof;

FIG. 8A illustrates a latticed area generated by a combination of positive directions of linear X, Y, and Z axes of the five-axis machining machine illustrated in FIG. 5;

FIG. 8B illustrates a latticed area generated by a combination of positive directions of the linear X and Y axes of the five-axis machining machine illustrated in FIG. 5 and a negative direction of the linear Z axis thereof;

FIG. 9A illustrates a latticed area generated by a combination of positive directions of the linear X and Z axes of the five-axis machining machine illustrated in FIG. 5 and a negative direction of the linear Y axis thereof;

FIG. 9B illustrates a latticed area generated by a Combination of a positive direction of the linear X axis of the five-axis machining machine illustrated in FIG. 5 and negative directions of the linear Y and Z axes thereof;

FIG. 11A illustrates a latticed area generated by a combination of negative directions of the linear X and Y axes of the five-axis machining machine illustrated in FIG. 5 and positive direction of the linear Z axis thereof;

FIG. 11B illustrates a latticed area generated by a combination of negative directions of the linear X, Y, and Z axes of the five-axis machining machine illustrated in FIG. 5;

FIG. 15A illustrates a latticed area generated by a combination of a positive direction of the master rotation axis (A) of the five-axis machining machine illustrated in FIG. 13 and a negative direction of the slave rotation axis (C) thereof;

FIG. 15B illustrates a latticed area generated by a combination of a negative direction of the master rotation axis (A) of the five-axis machining machine illustrated in FIG. 13 and a negative direction of the slave rotation axis (C) thereof.

DETAILED DESCRIPTION OF THE PREFERRED EMBODIMENTS

Figure 1:
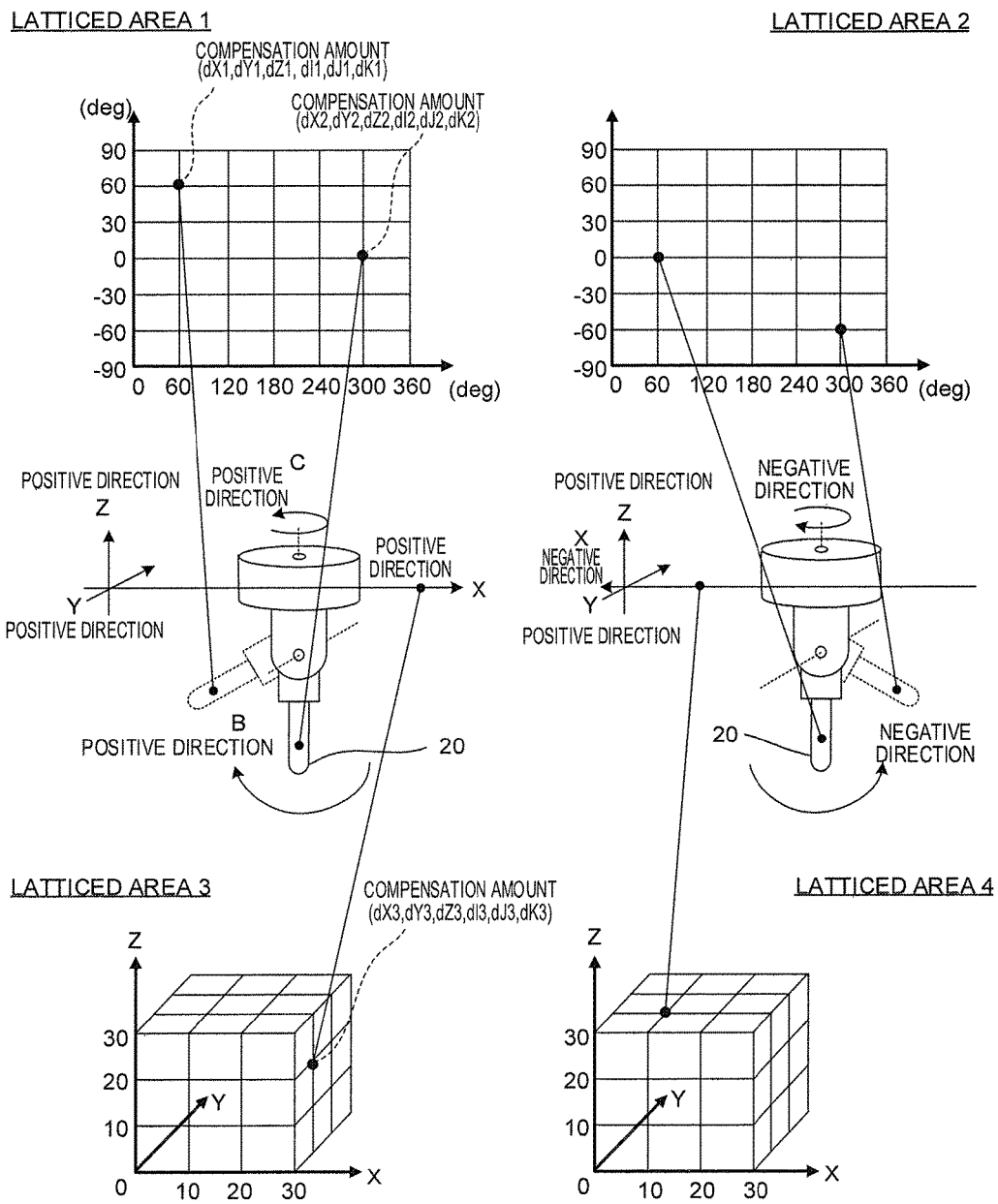
FIG. 1 is a diagram illustrating a method of generating latticed area divided by lattice points formed at a predetermined interval within a movement area of a rotation axis or a linear axis in a movement direction of each axis and setting a translation compensation amount and a rotation compensation amount corresponding to the lattice points by a numerical controller according to the invention.

In the invention, as illustrated in FIG. 1, a numerical controller controlling a five-axis machining machine machining a workpiece by three linear axes and two rotation axes is used to generate a latticed area divided by lattice points formed at a predetermined interval within a movement area of a rotation axis or a linear axis in a movement direction of each axis and to set a translation compensation amount and a rotation compensation amount corresponding to the lattice points.

In this way, the compensation amount is set in the latticed area prepared in a movement direction of each axis, the axis movement direction is determined by a compensation process unit, the translation compensation amount or the rotation compensation amount is acquired from the axis movement direction latticed area based on the determined axis movement direction, and the compensation is performed, thereby driving three linear axes so that a tool center point position is located on a workpiece without an error.

A combination of the axis movement directions generating latticed area is illustrated in FIGS. 2A and 2B. As a combination of the rotation axis illustrated in FIG. 2A, there are four combinations in consideration of the movement directions of two components. As a combination of the linear axis illustrated in FIG. 2B, there are eight combinations in consideration of the movement directions of three components. All combinations are not essential, but a necessary combination may be selected so that the axis movement direction latticed area is prepared by the selected combination.

Figure 3:
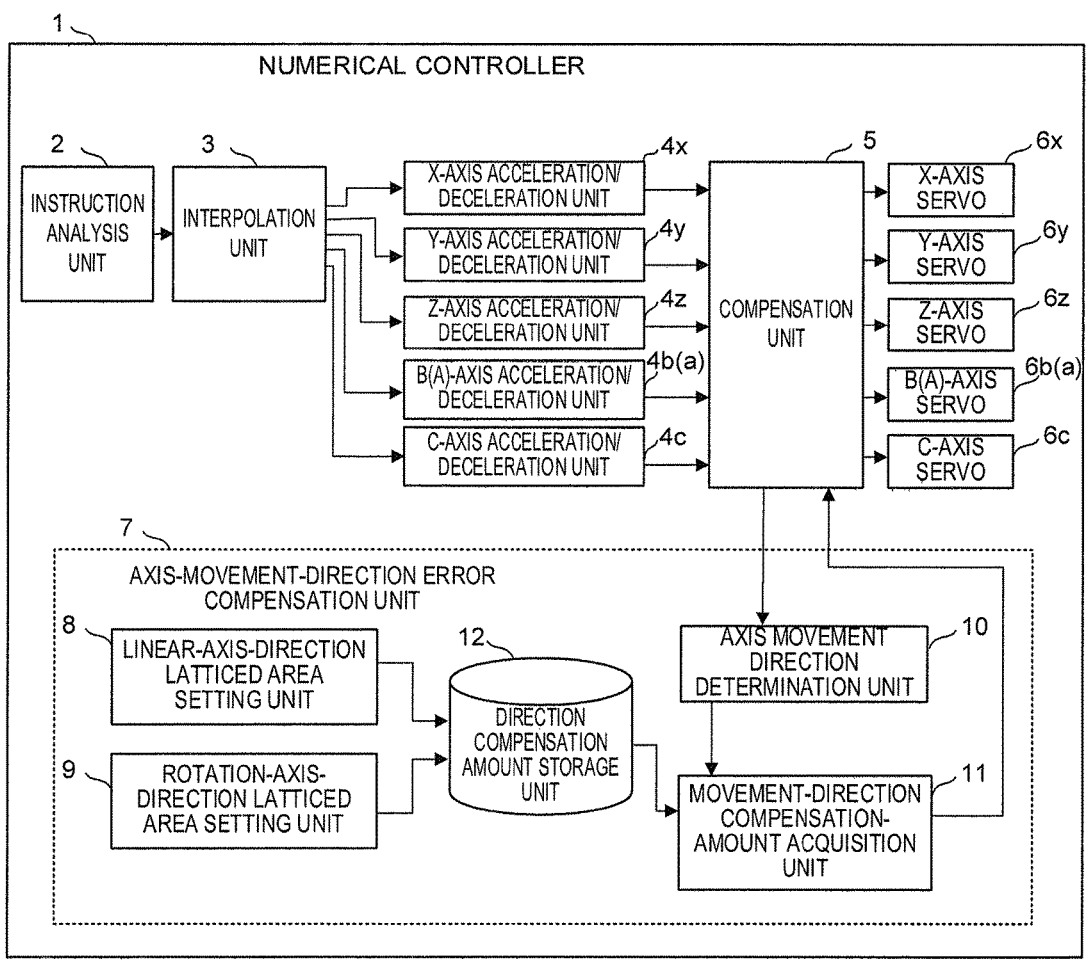
FIG. 3 is a functional block diagram of a numerical controller according to an embodiment of the invention.

FIG. 3 is a functional block diagram of a numerical controller according to an embodiment of the invention.

A numerical controller 1 includes an instruction analysis unit 2, an interpolation unit 3, acceleration/deceleration units 4x to 4c for axes (the X axis, the Y axis, the Z axis, the B (or A) axis, and the C axis), a compensation unit 5, servos 6x to 6c for the respective axes, and an axis-movement-direction error compensation unit 7. The axis-movement-direction error compensation unit 7 includes a linear-axis-direction latticed area setting unit 8, a rotation-axis-direction latticed area setting unit 9, an axis movement direction determination unit 10, a movement-direction compensation-amount acquisition unit 11, and a direction compensation amount storage unit 12.

The instruction analysis unit 2 analyzes a block of a machining program and generates data used for the movement of each axis. The interpolation unit 3 performs an interpolation process on the data output from the instruction analysis unit 2 so as to generate interpolation data obtained by interpolating points on an instruction path for each axis every interpolation period.

The acceleration/deceleration units 4x to 4c for the respective axes perform an acceleration/deceleration process based on the interpolation data generated by the interpolation unit 3, calculates a speed of each axis every interpolation period, and outputs result data to the compensation unit 5. The compensation unit 5 instructs the axis-movement-direction error compensation unit 7 (to be described later) to calculate a compensation amount for the interpolation data after the acceleration/deceleration of the respective axes output from the acceleration/deceleration units 4x to 4c for the respective axes and carries out compensation for the interpolation data after the acceleration/deceleration of the respective axes, output from the acceleration/deceleration units 4x to 4c for the axes, based on the compensation amount acquired from the axis-movement-direction error compensation unit 7.

Then, the servos 6x to 6c for the respective axes control servo motors driving the respective axes of the machine, based on the compensation result of the compensation unit 5.

The linear-axis-direction latticed area setting unit 8 and the rotation-axis-direction latticed area setting unit 9 of the axis-movement-direction error compensation unit 7 set compensation data necessary for each direction calculated by a measurement and store the set compensation data in the direction compensation amount storage unit 12. The compensation data is set for each lattice point of each direction latticed area as described above in FIG. 1.

The axis movement direction determination unit 10 determines a movement direction of each axis based on the instruction or the interpolation data and the movement-direction compensation-amount acquisition unit 11 acquires necessary compensation data from the direction compensation amount storage unit 12 based on the determined axis movement direction.

Based on the compensation data obtained in this way, the compensation unit 5 compensates the translation error caused by the machine by the pitch error compensation or the straightness error compensation of prior art (see JP 2009-151756 A, described above).

Figure 4:
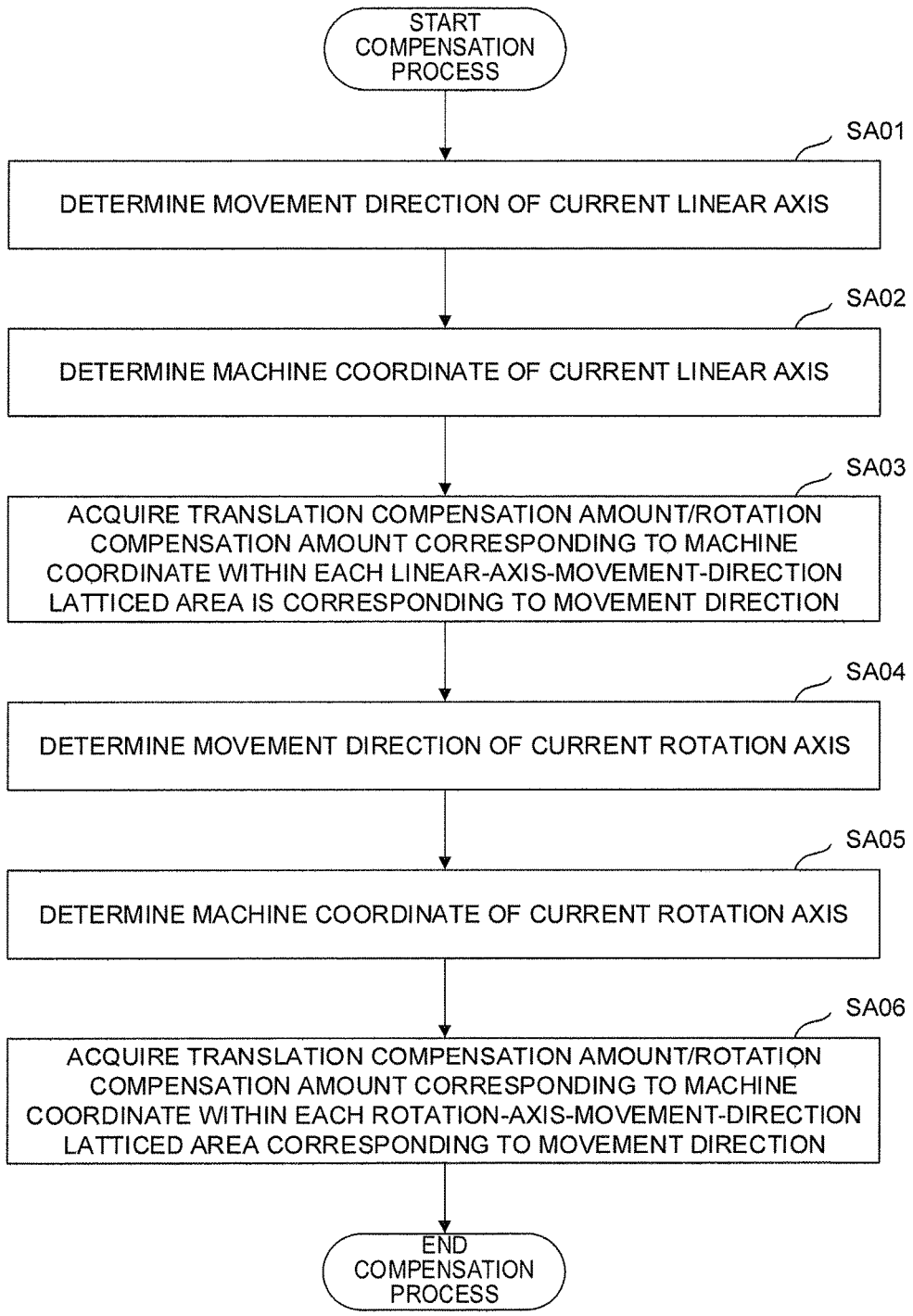
FIG. 4 is a flowchart illustrating a flow of a process performed by an axis-movement-direction error compensation unit of the numerical controller of FIG. 3.

FIG. 4 is a flowchart illustrating a flow of a process performed by the axis-movement-direction error compensation unit 7 of the numerical controller 1 of the embodiment.

[step SA01] The axis movement direction determination unit 10 determines the movement direction (the positive/ negative movement direction) of each current linear axis.

[step SA02] The movement-direction compensation-amount acquisition unit 11 acquires machine coordinates Pml (Pmx, Pmy, and Pmz) of the current linear axis.

[step SA03] The movement-direction compensation-amount acquisition unit 11 acquires translation compensation amount (dXl, dYl, and dZl) and rotation compensation amount (dIl, dJl, and dKl) corresponding to the machine coordinate Pml within the linear-axis-movement-direction latticed area corresponding to the movement direction determined in step SA01.

[step SA04] The axis movement direction determination unit 10 determines the movement direction (the positive/ negative movement direction) of each current rotation axis.

[step SA05] The movement-direction compensation-amount acquisition unit 11 acquires machine coordinates Pmr (Pmb(a) and Pmc) of the current rotation axis.

[step SA06] The movement-direction compensation-amount acquisition unit 11 acquires translation compensation amount (dXr, dYr, and dZr) and rotation compensation amount (dIr, dJr, and dKr) corresponding to the machine coordinates Pmr within the rotation-axis-movement-direction latticed area corresponding to the movement direction.

Hereinafter, an example will be described in which the numerical controller 1 according to the embodiment is applied to a machine tool having a linear axis and a rotation axis.

Figure 5:
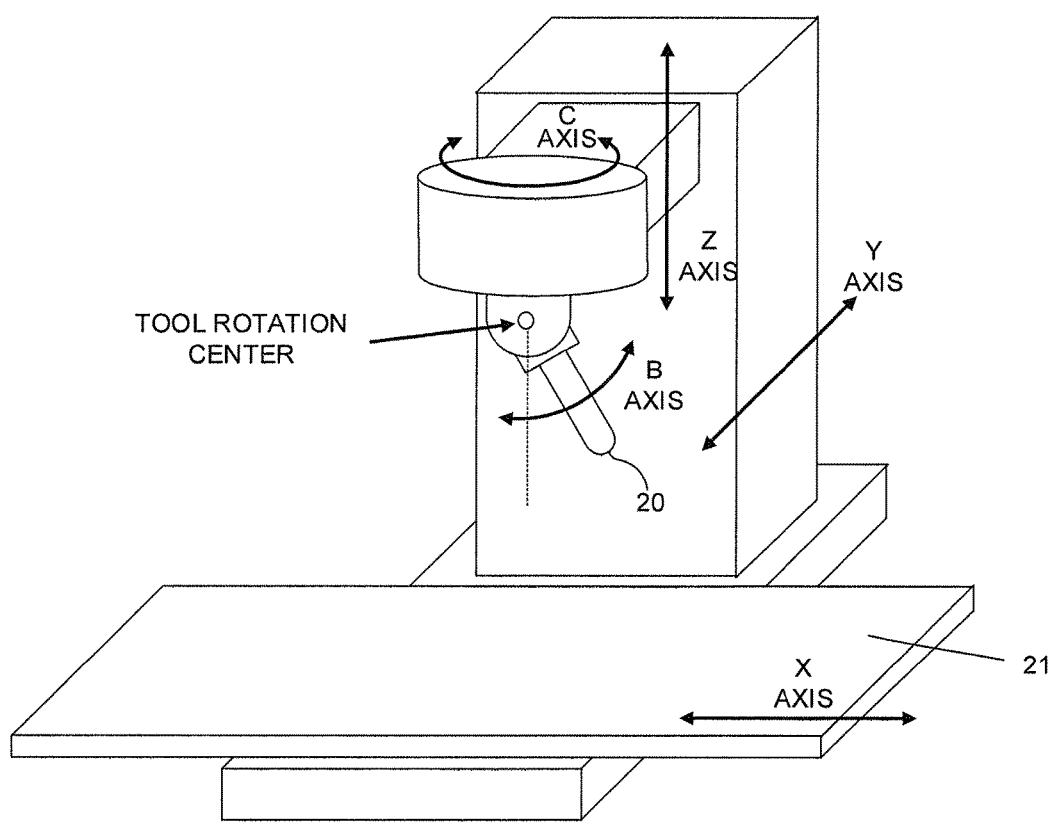
FIG. 5 is a diagram illustrating a tool head rotation five-axis machining machine controlled by the numerical controller of FIG. 3.
Figure 10A:
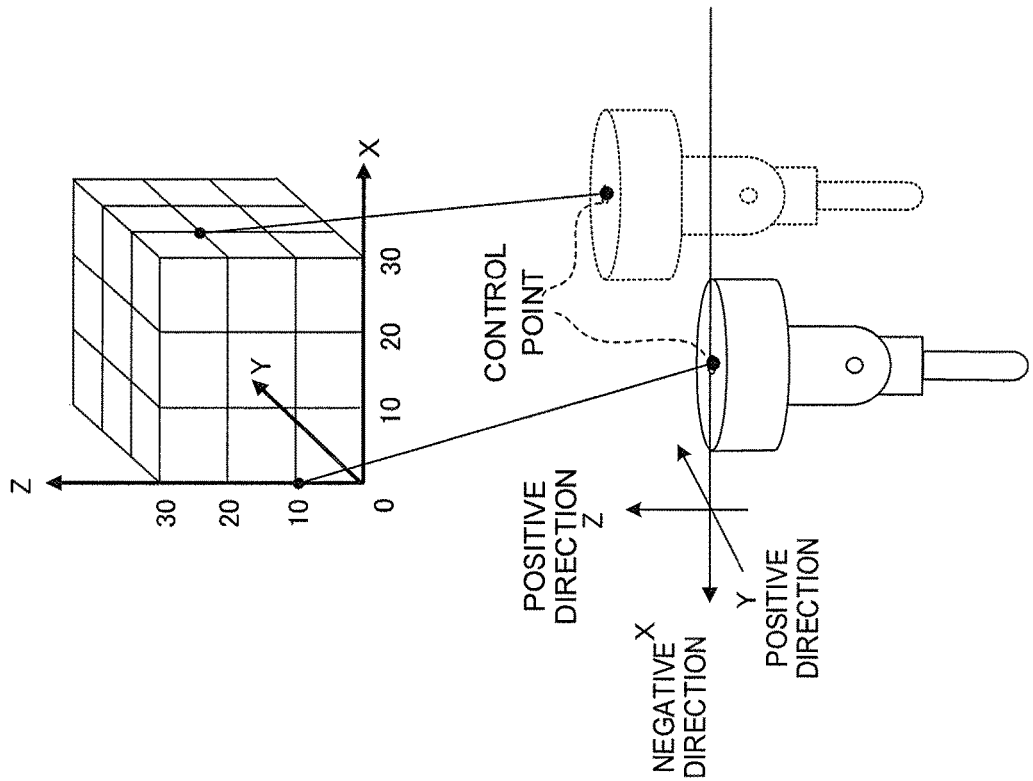
FIG. 10A illustrates a latticed area generated by a combination of a negative direction of the linear X axis of the five-axis machining machine illustrated in FIG. 5 and positive directions of the linear Y and Z axes thereof.
Figure 10B:
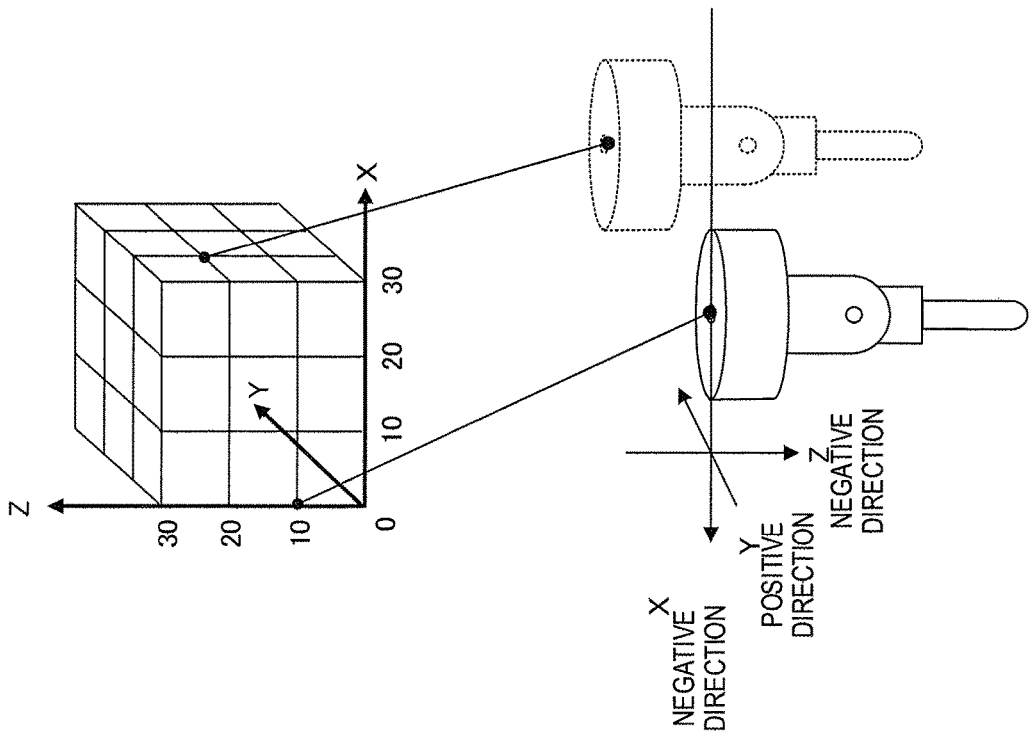
FIG. 10B illustrates a latticed area generated by a combination of negative directions of the linear X and Z axes of the five-axis machining machine illustrated in FIG. 5 and a positive direction of the linear Y axis thereof.

FIG. 5 is an example of a tool head rotation five-axis machining machine controlled by the numerical controller 1 of the invention. In the machine Configuration illustrated in FIG. 5, a tool head 20 rotating by the rotation of the C axis and inclined by the rotation of the B axis moves linearly in the Y axis direction and the Z axis direction and a base 21 on which a workpiece (not illustrated) is mounted moves linearly in the X axis direction.

FIG. 6A illustrates a latticed area 1 generated by a combination of a positive movement direction of a master rotation axis (C) of the five-axis machining machine illustrated in FIG. 5 and a positive movement direction of a slave rotation axis (B) thereof. FIG. 6B illustrates a latticed area 2 generated by a combination of a positive movement direction of the master rotation axis (C) of the five-axis machining machine illustrated in FIG. 5 and a negative movement direction of the slave rotation axis (B) thereof.

FIG. 7A illustrates a latticed area 3 generated by a combination of a negative movement direction of the master rotation axis (C) of the five-axis machining machine illustrated in FIG. 5 and a positive movement direction of the slave rotation axis (B) thereof. FIG. 7B illustrates a latticed area 4 generated by a combination of a negative movement direction of the master rotation axis (C) of the five-axis machining machine illustrated in FIG. 5 and a negative movement direction of the slave rotation axis (B) thereof.

These latticed area 1 to 4 correspond to the rotation-axis-movement-direction latticed areas. A translation compensation amount and a rotation compensation amount are set for the respective lattice points. Hereinafter, the latticed area 2 (FIG. 6B) will be exemplified.

In the latticed area 2 illustrated in FIG. 6B, for example, it is assumed that an error is measured in advance in a case where the C axis moves in the positive direction at 60 degree and the B axis moves in the negative direction at 0 degree, and compensation amount (dX3, dY3, dZ3, dI3, dJ3, and dK3) are set for the lattice points by the rotation-axis-direction latticed area setting unit 9 and are stored in the direction compensation amount storage unit 12. The movement-direction compensation-amount acquisition unit 11 acquires the compensation amounts for the respective lattice points set and stored in this way from the direction compensation amount storage unit 12. Regarding the above compensation amounts, dX3, dY3 and dZ3 are translation compensation amounts and dI3, dJ3 and dK3 are rotation compensation amounts.

Further, in the latticed area 2 illustrated in FIG. 6B, for example, it is assumed that an error is measured in advance in a case where the C axis moves in the positive direction at 300 degree and the B axis moves in the negative direction at −60 degree and compensation amount (dX4, dY4, dZ4, dI4, dJ4, and dK4) are set for the lattice points by the rotation-axis-direction latticed area setting unit 9 and are stored in the direction compensation amount storage unit 12. The movement-direction compensation-amount acquisition unit 11 acquires the compensation amounts for the respective lattice points set and stored in this way from the direction compensation amount storage unit 12. Regarding the above compensation amounts, dX4, dY4 and dZ4 are translation compensation amounts and dI4, dJ4 and dK4 are rotation compensation amounts. The compensation amounts are set and acquired for the other lattice points in response to the movement directions of the rotation axes (B and C) in the same way.

FIGS. 8A to 11B illustrate the latticed areas generated by the combinations (eight combinations) of the movement directions of the linear X, Y, and Z axes. These latticed areas correspond to the linear-axis-movement-direction latticed areas.

Latticed Area 1 (FIG. 8A): Area generated by combination of positive directions of linear X, Y, and Z axes Latticed area 2 (FIG. 8B): Area generated by combination of positive directions of linear X and Y axes and negative direction of linear Z axis Latticed Area 3 (FIG. 9A): Area generated by combination of positive directions of linear X and Z axes and negative direction of linear Y axis Latticed Area 4 (FIG. 9B): Area generated by combination of positive direction of linear X axis and negative directions of linear Y and Z axes Latticed Area 5 (FIG. 10A): Area generated by combination of negative direction of linear X axis and the positive directions of Y and Z axes Latticed Area 6 (FIG. 10B): Area generated by combination of negative directions of linear X and Z axes and positive direction of linear Y axis Latticed Area 7 (FIG. 11A): Area generated by combination of negative directions of linear X and Y axes and positive direction of linear Z axis Latticed Area 8 (FIG. 11B): Area generated by combination of negative directions of linear X, Y, and Z axes Translation compensation amount (dX, dY, and dZ) and rotation compensation amount (dI, dJ, and dK) are set for the respective lattice points and the compensation amounts corresponding to the axial movement are acquired. Hereinafter, the latticed area 2 (FIG. 8B) will be described as an example.

In the latticed area 2 illustrated in FIG. 8B, for example, it is assumed that an error is measured in advance in a case where the X and Y axes move in the positive direction at 0 mm and the Z axis moves in the negative direction at 10 mm and the compensation amount (dX3, dY3, dZ3, dI3, dJ3, and dK3) are set for the lattice points by the linear-axis-direction latticed area setting unit 8 and are stored in the direction compensation amount storage unit 12. The movement-direction compensation-amount acquisition unit 11 acquires the compensation amounts of the respective lattice points set and stored in this way from the direction compensation amount storage unit 12. Regarding the above compensation amounts, dX3, dY3, and dZ3 are the translation compensation amounts and dI3, dJ3, and dK3 are the rotation compensation amounts.

Further, in the latticed area 2 illustrated in FIG. 8B, for example, it is assumed that an error is measured in advance in a case where the X axis moves in the positive direction at 30 mm, the Y axis moves in the positive direction at 10 mm, and the Z axis moves in the negative direction at 20 mm and the compensation amount (dX4, dY4, dZ4, dI4, dJ4, and dK4) are set for the lattice points by the linear-axis-direction latticed area setting unit 8 and are stored in the direction compensation amount storage unit 12. The movement-direction compensation-amount acquisition unit 11 acquires the compensation amount of the respective lattice points set and stored in this way from the direction compensation amount storage unit 12. Regarding the above compensation amounts, dX4, dY4, and dZ4 are the translation compensation amounts and dI4, dJ4, and dK4 are the rotation compensation amounts. The compensation amounts are set and acquired for the other lattice points in response to the movement directions of the linear axes (X, Y, and Z) in the same way.

Figure 12:
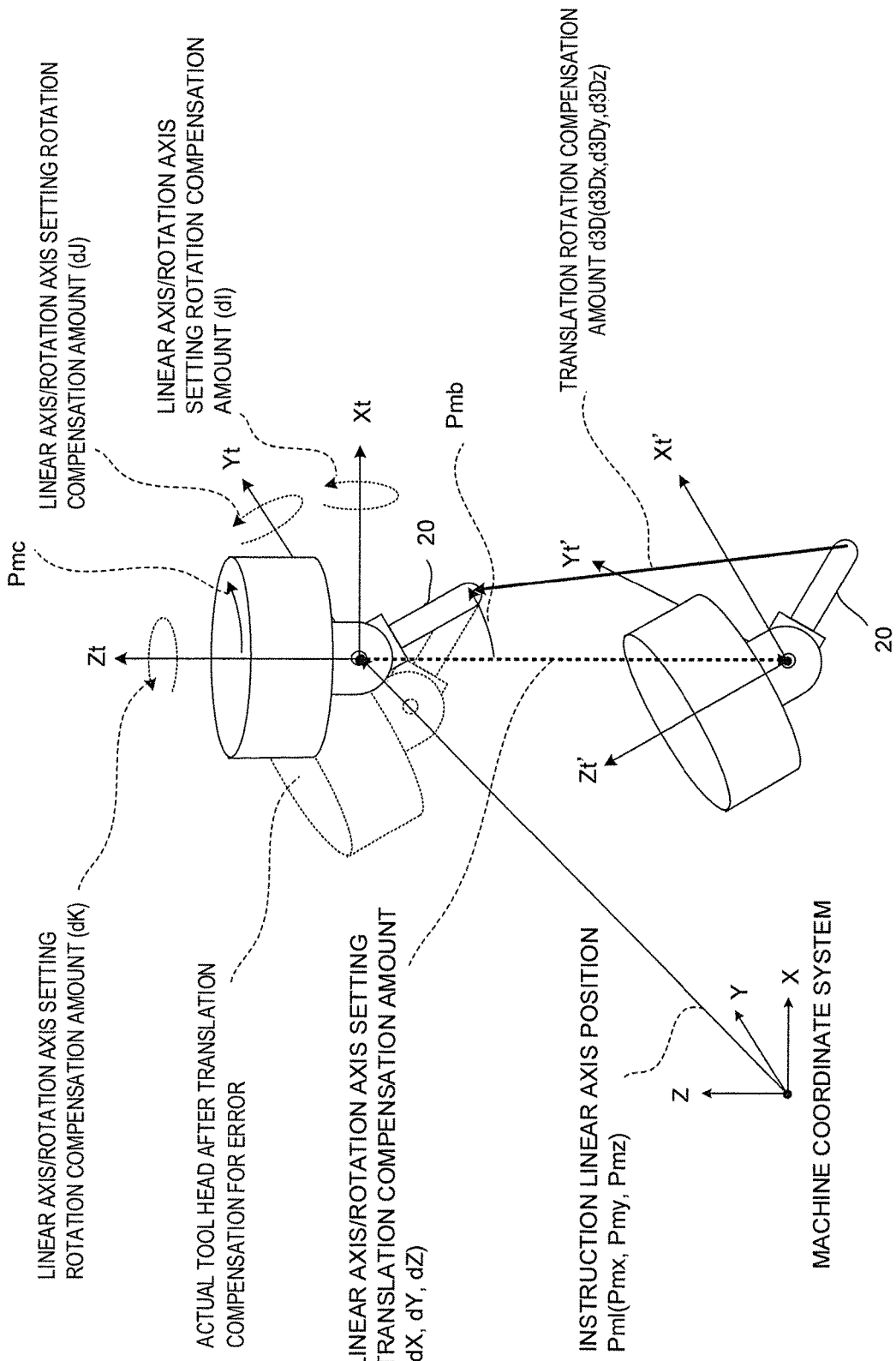
FIG. 12 is a diagram illustrating an error compensation method for a translation error and a rotation error depending on a linear axis and a rotation axis.

FIG. 12 is a diagram illustrating an error compensation method for the translation error and the rotation error depending on the linear axis and the rotation axis.

In FIG. 12, when the coordinate system of the tool head 20 is indicated by a coordinate (Xt, Yt, and Zt) in which the rotation center of the tool head 20 is set as an origin, the coordinate system of the tool head 20 becomes a coordinate (Xt', Yt', and Zt') by the translation error and the rotation error depending on the linear axis and the rotation axis. The linear axis/rotation axis setting translation compensation amount (dX, dY, and dZ) indicate the compensation amounts for the translation errors of the X/Y/Z axis directions in the coordinate system. The linear axis/rotation axis setting rotation compensation amount (dI, dJ, and dK) indicate the compensation amounts in the rotation direction about the X, Y, and Z axes in the coordinate system. These errors are small, but are magnified for the comprehension in FIG. 12.

The linear axis/rotation axis setting translation compensation amounts based on the instruction linear axis position Pml (Pmx, Pmy, and Pmz) and the instruction rotation axis position Pmr (Pmc and Pmb) are set as "dX, dY, and dZ" and the linear axis/rotation axis setting rotation compensation amounts are set as "dI, dJ, and dK". For example, in the example illustrated in FIG. 12, it is assumed that the X axis moves in the negative direction, the Y axis moves in the positive direction, and the Z axis moves in the negative direction at the instruction linear axis position Pml (Pmx, Pmy, and Pmz). In that case, the translation compensation amount (dXl, dYl, and dZl) and the rotation compensation amount (dIl, dJl, and dKl) at the position. Pml (Pmx, Pmy, and Pmz) are acquired by the proportional distribution of the translation compensation amounts and the rotation compensation amounts in the lattice (which is generally a lattice having eight peripheral points) near the position Pml (Pmx, Pmy, and Pmz) of a latticed area 6 of FIG. 10B.

Similarly, it is assumed that the C axis moves in the negative direction and the B axis moves in the positive direction at the instruction rotation axis position Pmr (Pmc and Pmb). In that case, the translation compensation amount (dXr, dYr, and dZr) and the rotation compensation amount (dIr, dJr, and dKr) at the position Pmr (Pmc and Pmb) are acquired by the proportional distribution of the translation compensation amounts and the rotation compensation amounts in the lattice (which is generally a lattice having four peripheral points) near the position Pmr (Pmc and Pmb) of the latticed area 3 of FIG. 7A.

In the case of the other movement directions of the X, Y, Z, B, and C axes, the translation compensation amount (dXl, dYl, and dZl) and the rotation compensation amount (dIl, dJl, and dKl) at the position Pml (Pmx, Pmy, and Pmz) and the translation compensation amount (dXr, dYr, and dZr) and the rotation compensation amount (dIr, dJr, and dKr) at the position Pmr (Pmc and Pmb) are obtained from the other latticed areas in the same way. Although the following description is for prior art, the linear axis/rotation axis setting translation compensation amount (dX, dY, and dZ)= (dXl, dYl, and dZl)+(dXr, dYr, and dZr) and the linear axis/rotation axis setting rotation compensation amount (dI, dJ, and dK)=(dIl, dJl, and dKl)+(dIr, dJr, and dKr) are obtained.

The translation/rotation compensation amount d3D (d3Dx, d3Dy, and d3Dz) (see JP 2009-151756 A) obtained from the linear axis/rotation axis setting translation compensation amount (dX, dY, and dZ) and the linear axis/ rotation axis setting rotation compensation amount (dI, dJ, and dK) are added to the instruction linear axis position Pml (Pmx, Pmy, and Pmz) so as to obtain the compensation linear axis position Pml' (Pmx', Pmy', and Pmz'). The linear X, Y, and Z axes are driven to the compensation linear axis position Pml' (Pmx', Pmy', and Pmz') and the rotation B and C axes are driven to the instruction position. Accordingly, the tool center point position can be moved to a desired position without an error.

Figure 13:
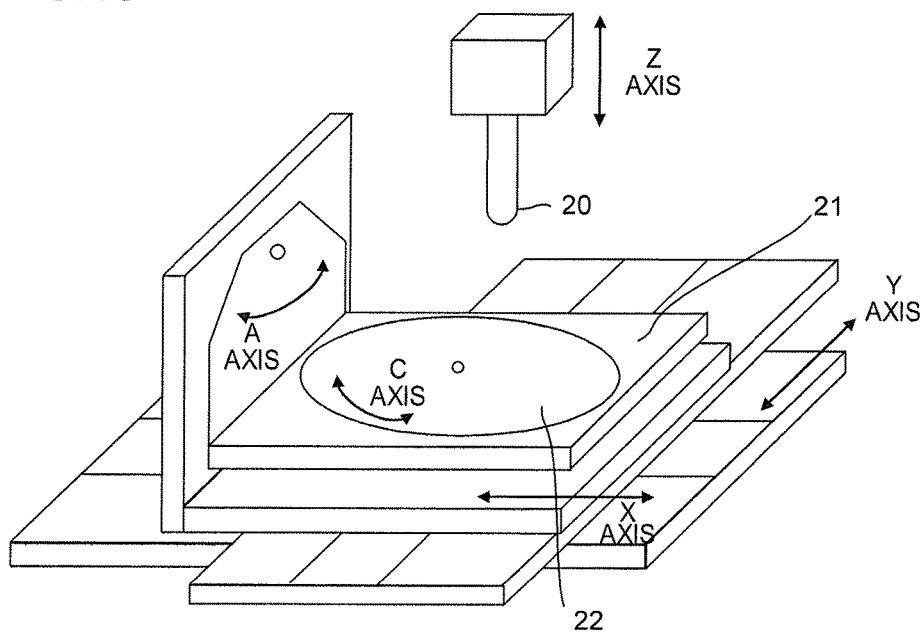
FIG. 13 is a diagram illustrating a table rotation five-axis machining machine controlled by the numerical controller of the invention.

FIG. 13 is an example of a table rotation five-axis machining machine controlled by the numerical controller 1 of the embodiment. In the machine configuration illustrated in the drawing, a table 22 rotating by the rotation of the C axis and inclined by the rotation of the A axis is loaded on the Y axis, the Y axis moves linearly on the X axis, and the tool head 20 moves linearly up and down in the Z axis.

Figure 14A:
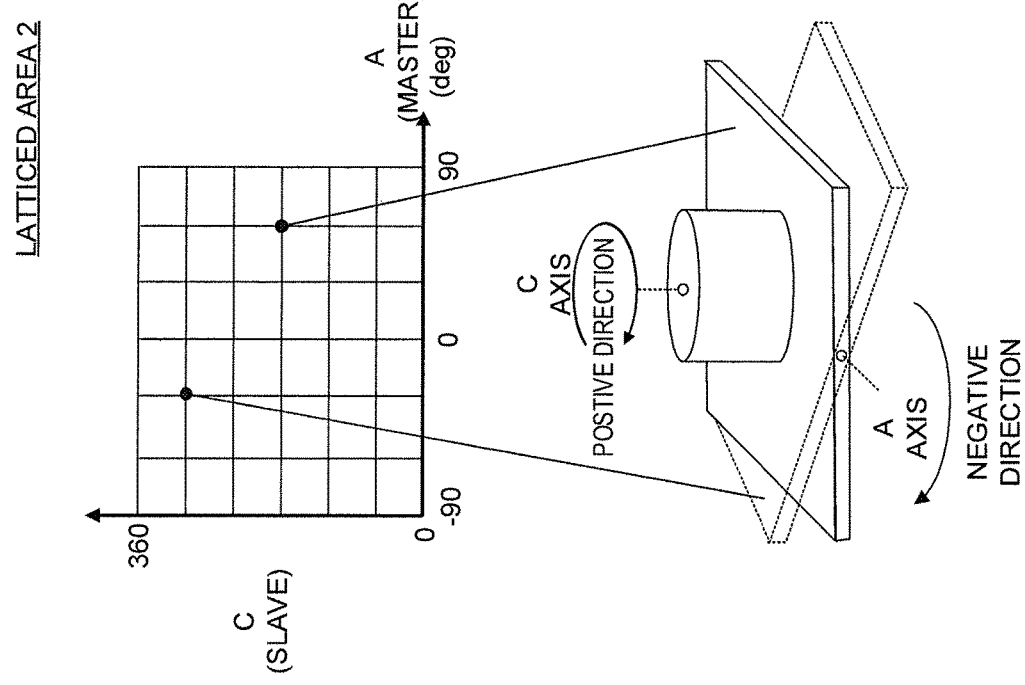
FIG. 14A illustrates a latticed area generated by a combination of a positive direction of a master rotation axis (A) of a five-axis machining machine illustrated in FIG. 13 and a positive direction of a slave rotation axis (C) thereof.
Figure 14B:
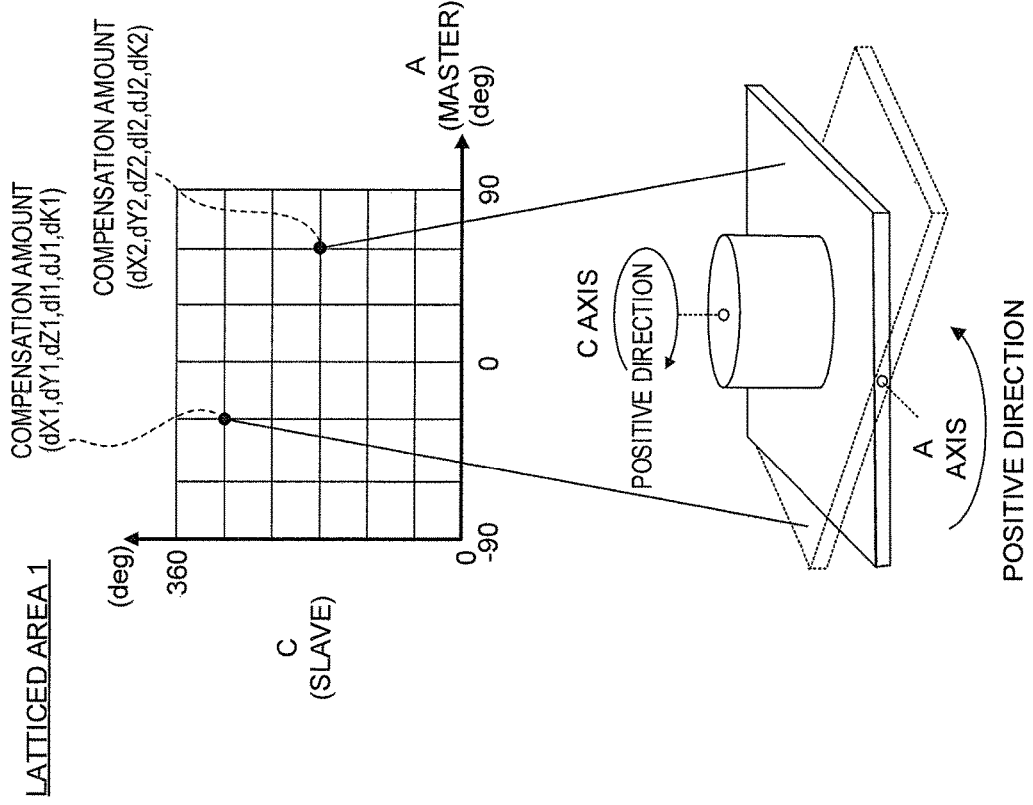
FIG. 14B illustrates a latticed area generated by a combination of a negative direction of the master rotation axis (A) of the five-axis machining machine illustrated in FIG. 13 and a positive direction of the slave rotation axis (C) thereof.

FIG. 14A illustrates the latticed area 1 generated by a combination of the positive direction of the master rotation axis (A) and the positive direction of the slave rotation axis (C) and FIG. 14B illustrates the latticed area 2 generated by a combination of the negative direction of the master rotation axis (A) and the positive direction of the slave rotation axis (C).

FIG. 15A illustrates the latticed area 3 generated by a combination of the positive direction of the master rotation axis (A) and the negative direction of the slave rotation axis (C) and FIG. 15B illustrates the latticed area 4 generated by a combination of the negative direction of the master rotation axis (A) and the negative direction of the slave rotation axis (C).

The translation compensation amount (dX, dY, and dZ) and the rotation compensation amount (dI, dJ, and dK) are set for the respective lattice points. Since the latticed areas in the X, Y, and Z axes are similar to the first embodiment, the repetitive description will not be made.

Figure 16:
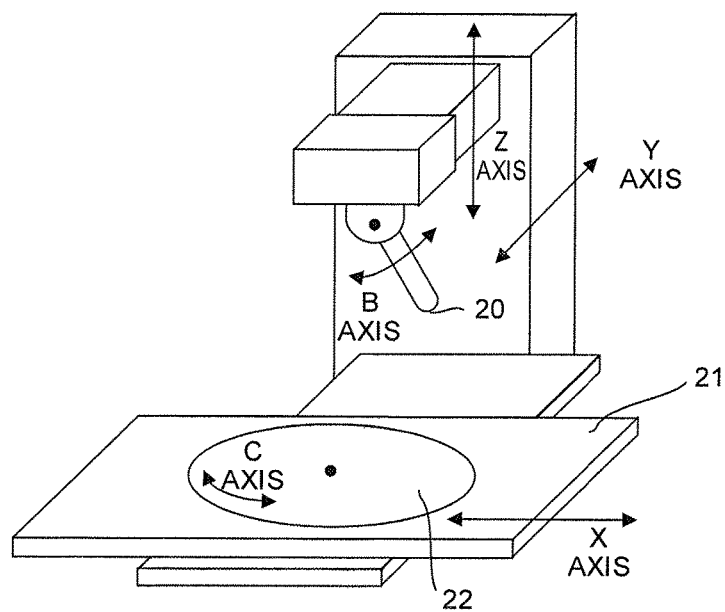
FIG. 16 is an example of a mixed type five-axis machining machine controlled by the numerical controller according to the invention.

FIG. 16 is an example of a mixed type five-axis machining machine controlled by the numerical controller 1 of the embodiment. In the machine configuration illustrated in FIG. 16, a tool head 20 inclined by the rotation of the B axis moves linearly in the Y axis and the Z axis and the table 22 rotating by the rotation of the C axis moves linearly in the X axis. Since the setting of the latticed area is similar to the five-axis machining machine of which the tool head 20 or the table rotates, the repetitive description will not be made.

In this way, since an error changed by the movement direction is also considered in addition to an error caused by the linear axis/rotation axis position of the machine in the numerical controller having a function proposed by the invention, the quality of the shape of, a workpiece to be machined can be improved. The numerical controller of the invention can correct, for example, the following errors.

Error occurring in each movement direction due to degradation of driving source

Error occurring when moving in a direction opposite to gravity direction

While the embodiments of the invention have been described, the invention is not limited to the above-described embodiments and can be appropriately modified into various forms.

The invention claimed is:

1. A numerical controller controlling a five-axis machining machine having three linear axes and two rotation axes and machining a workpiece set on a table based on an instruction of a program, comprising:
a processor configured to:
store, in a memory device, a linear-axis-caused compensation amount for each combination of movement directions of the three linear axes and a rotation-axis-caused compensation amount for each combination of movement directions of the two rotation axes, the linear-axis-caused compensation amount for correcting positional error between target positions and actual positions of the machining machine along the three linear axes, and the rotational-axis-caused compensation amount for correcting positional error between target positions and actual positions of the machining machine along the two rotation axes;
determine linear axis movement direction for each of the three linear axes, and a rotation axis movement direction for each of the two rotation axes;
acquire, from the memory device, a stored linear-axis-caused compensation amount for the combination of the determined linear axis movement direction of each of the three linear axes and a stored rotation-axis-caused compensation amount for the combination of the determined rotation axis movement direction of each of the two rotation axes;
calculate a translation/rotation compensation amount based on the linear-axis-caused compensation amount and the rotation-axis-caused compensation amount;
calculate corrected axis positions for each axis of the five-axis machining machine by modifying the positions of each axis based on the calculated translation/rotation compensation amount; and
control the five-axis machining machine based on the corrected axis positions.

2. The numerical controller according to claim 1, wherein the processor is further configured to divide a three-dimensional coordinate system space formed of the three linear axes, for each combination of the linear axis movement directions of the three linear axes, into latticed areas having a predetermined interval in each axis direction, and store a lattice point compensation vector formed of a translation compensation amount and a rotation compensation amount at each lattice point of the divided latticed areas.

3. The numerical controller according to claim 1, wherein the processor is further configured to divide a two-dimensional coordinate system space formed of the two rotation axes, for each combination of the rotation axis movement directions of the two rotation axes, into latticed areas having a predetermined interval in each axis direction and store a lattice point compensation vector formed of a translation compensation amount and a rotation compensation amount at each lattice point of the divided latticed areas.

* * * * *